(12) United States Patent
Karpin et al.

(10) Patent No.: US 8,593,431 B1
(45) Date of Patent: Nov. 26, 2013

(54) EDGE POSITIONING ACCURACY IN A MUTUAL CAPACITIVE SENSE ARRAY

(75) Inventors: Oleksandr Karpin, Lviv (UA); Vasyl Mandziy, Lviv (UA)

(73) Assignee: Cypress Semiconductor Corp., San Jose, CA (US)

( * ) Notice: Subject to any disclaimer, the term of this patent is extended or adjusted under 35 U.S.C. 154(b) by 448 days.

(21) Appl. No.: 13/073,141

(22) Filed: Mar. 28, 2011

Related U.S. Application Data (60) Provisional application No. 61/376,533, filed on Aug. 24, 2010.

(51) Int. Cl.
*G06F 3/045* (2006.01)

(52) U.S. Cl.
USPC .......................................... 345/174; 345/173

(58) Field of Classification Search
USPC ................... 345/173–177; 178/18.01–18.07, 178/19.01–19.05
See application file for complete search history.

(56) References Cited

U.S. PATENT DOCUMENTS

| | | | |
|---|---|---|---|
| 6,177,918 | B1 | 1/2001 | Colgan et al. |
| 7,821,274 | B2 | 10/2010 | Philipp et al. |
| 2005/0275382 | A1 | 12/2005 | Stessman et al. |
| 2006/0114247 | A1 | 6/2006 | Brown |
| 2006/0227114 | A1 | 10/2006 | Geaghan et al. |
| 2008/0047764 | A1 | 2/2008 | Lee et al. |
| 2008/0309633 | A1 | 12/2008 | Hotelling et al. |
| 2010/0079384 | A1 | 4/2010 | Grivna |
| 2010/0079402 | A1 | 4/2010 | Grunthaner et al. |
| 2010/0156811 | A1 | 6/2010 | Long et al. |

OTHER PUBLICATIONS

Paul Dietz and Darren Leigh, "DiamondTouch: A Multi-User Touch Technology," downloaded from http://www.merl.com/papers/docs/TR2003-125.pdf on Jun. 29, 2011; 11 pages.
Otmar Hilliges, "Bringing the Physical to the Digital: A New Model for Tabletop Interaction," downloaded from http://edoc.ub.uni-muenchen.de/10961/1/Hilliges_Otmar.pdf on Jun. 28, 2011; 203 pages.
USPTO Advisory Action for U.S. Appl. No. 11/512,042 dated Feb. 23, 2011; 3 pages.
USPTO Final Rejection for U.S. Appl. No. 11/512,042 dated Dec. 21, 2010; 7 pages.
USPTO Non-Final Rejection, U.S. Appl. No. 11/512,042 dated Jul. 13, 2010, 14 pages.

*Primary Examiner* — Ricardo L Osorio (57) ABSTRACT

A mutual capacitive sense array configured to improve edge performance in tracking user inputs is described. A mutual capacitive sense array comprises a first and second plurality of sense elements and a visual display configured below the sense array. The display is configured to contact the first plurality of sense elements, where each of the first and second plurality of sense elements has a first area and second area, respectively, and wherein the second area is less than the first area. A method is described to scan a mutual capacitive sense array for a user input, the array comprising a first, second, and third plurality of sense elements, wherein the third plurality of sense elements are arranged in parallel along the exterior edge of the mutual capacitive sense array. The third plurality of sense elements effectively reduces the tracking error occurring at the edges of the mutual capacitive sense array.

20 Claims, 10 Drawing Sheets

EDGE POSITIONING ACCURACY IN A MUTUAL CAPACITIVE SENSE ARRAY

RELATED APPLICATION

This application claims priority to U.S. Provisional Application 61/376,533 filed Aug. 24, 2010, which is hereby incorporated by reference in its entirety.

TECHNICAL FIELD

This disclosure relates to the field of user interface devices and, in particular, to capacitive sense devices.

BACKGROUND

Capacitive sense arrays may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can be arranged in the form of a capacitive sense array for a touch-sensing surface. When a conductive object, such as a finger, comes in contact or close proximity with the touch-sensing surface, the capacitance of one or more capacitive touch sense elements changes. The capacitance changes of the capacitive touch sense elements can be measured by an electrical circuit. The electrical circuit converts the measured capacitances of the capacitive sense elements into digital values.

Transparent touch screens that utilize capacitive sense arrays are ubiquitous in today's industrial and consumer markets. They can be found on cellular phones, GPS devices, cameras, computer screens, MP3 players, digital tablets, and the like. In contemporary cellular phones and smart phones, touch screen area is of significant concern to manufacturers given the small amount of space available for user interaction. As such, manufacturers seek a touch screen that maximizes its useable area while maintaining uniform position tracking accuracy. However, conventional designs exhibit considerable position tracking error near the edges of the touch screen. New technologies are sought to help improve edge performance in mutual capacitance arrays.

BRIEF DESCRIPTION OF THE DRAWINGS

The present invention is illustrated by way of example, and not of limitation, in the figures of the accompanying drawings in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
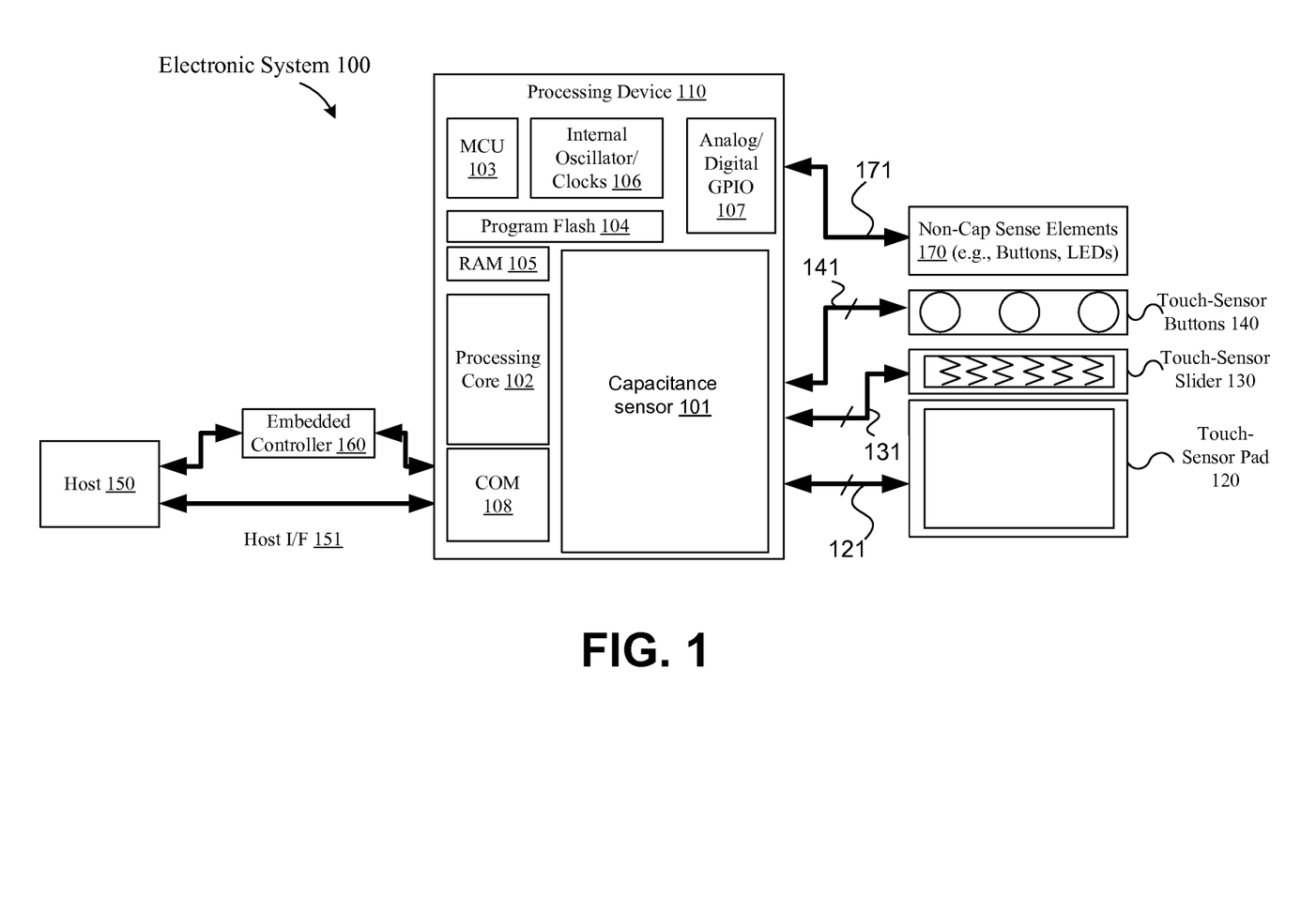
FIG. 1 is a block diagram illustrating one embodiment of an electronic system having a processing device for detecting a presence of a conductive object according to an embodiment of the present invention.

FIG. 1 is a block diagram illustrating one embodiment of an electronic system 100 having a processing device for detecting a presence of a conductive object according to an embodiment of the present invention. Electronic system 100 includes processing device 110, touch-sense pad 120, touch-sense slider 130, touch-sense buttons 140, host processor 150, embedded controller 160, and non-capacitance sense elements 170. The processing device 110 may include analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO ports 107.

As illustrated, capacitance sensor 101 may be integrated into processing device 110. Capacitance sensor 101 may include analog I/O for coupling to an external component, such as touch-sense pad 120, touch-sense slider 130, touch-sense buttons 140, and/or other devices. Capacitance sensor 101 and processing device 110 are described in more detail below.

The embodiments described herein are not limited to touch-sense pads for notebook implementations, but can be used in other capacitive sense implementations, for example, the sense device may be a touch screen, a touch-sense slider 130, or touch-sense buttons 140 (e.g., capacitance sense buttons). In one embodiment, these sense devices may include one or more capacitive sense elements. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sense implementations may be used in conjunction with non-capacitive sense elements, including but not limited to pick buttons, sliders (ex. display brightness and contrast), scroll-wheels, multi-media control (ex. volume, track advance, etc) handwriting recognition and numeric keypad operation.

In one embodiment, the electronic system 100 includes a touch-sense pad 120 coupled to the processing device 110 via bus 121. Touch-sense pad 120 may include a multi-dimension sense array. The multi-dimension sense array includes multiple sense elements, organized as rows and columns. In another embodiment, the electronic system 100 includes a touch-sense slider 130 coupled to the processing device 110 via bus 131. Touch-sense slider 130 may include a single-dimension sense array. The single-dimension sense array includes multiple sense elements, organized as rows, or alternatively, as columns. In another embodiment, the electronic system 100 includes touch-sense buttons 140 coupled to the processing device 110 via bus 141. Touch-sense buttons 140 may include a single-dimension or multi-dimension sense array. The single- or multi-dimension sense array may include multiple sense elements. For a touch-sense button, the sense elements may be coupled together to detect a presence of a conductive object over the entire surface of the sense device. Alternatively, the touch-sense buttons 140 may have a single sense element to detect the presence of the conductive object. In one embodiment, touch-sense buttons 140 may include a capacitive sense element. Capacitive sense elements may be used as non-contact sense elements. These sense elements, when protected by an insulating layer, offer resistance to severe environments.

The electronic system 100 may include any combination of one or more of the touch-sense pad 120, touch-sense slider 130, and/or touch-sense button 140. In another embodiment, the electronic system 100 may also include non-capacitance sense elements 170 coupled to the processing device 110 via bus 171. The non-capacitance sense elements 170 may include buttons, light emitting diodes ("LEDs"), and other user interface devices, such as a mouse, a keyboard, or other functional keys that do not require capacitance sensing. In one embodiment, busses 171, 141, 131, and 121 may be a single bus. Alternatively, these buses may be configured into any combination of one or more separate buses.

Processing device 110 may include internal oscillator/clocks 106 and communication block ("COM") 108. The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 may be a Programmable System on a Chip ("PSoC™") processing device, manufactured by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sense device and sends the raw data to a host computer where it is analyzed by an application. In effect the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 101.

It should be noted that the components of electronic system 100 may include all the components described above. Alternatively, electronic system 100 may include only some of the components described above.

In one embodiment, electronic system 100 may be used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Figure 2:
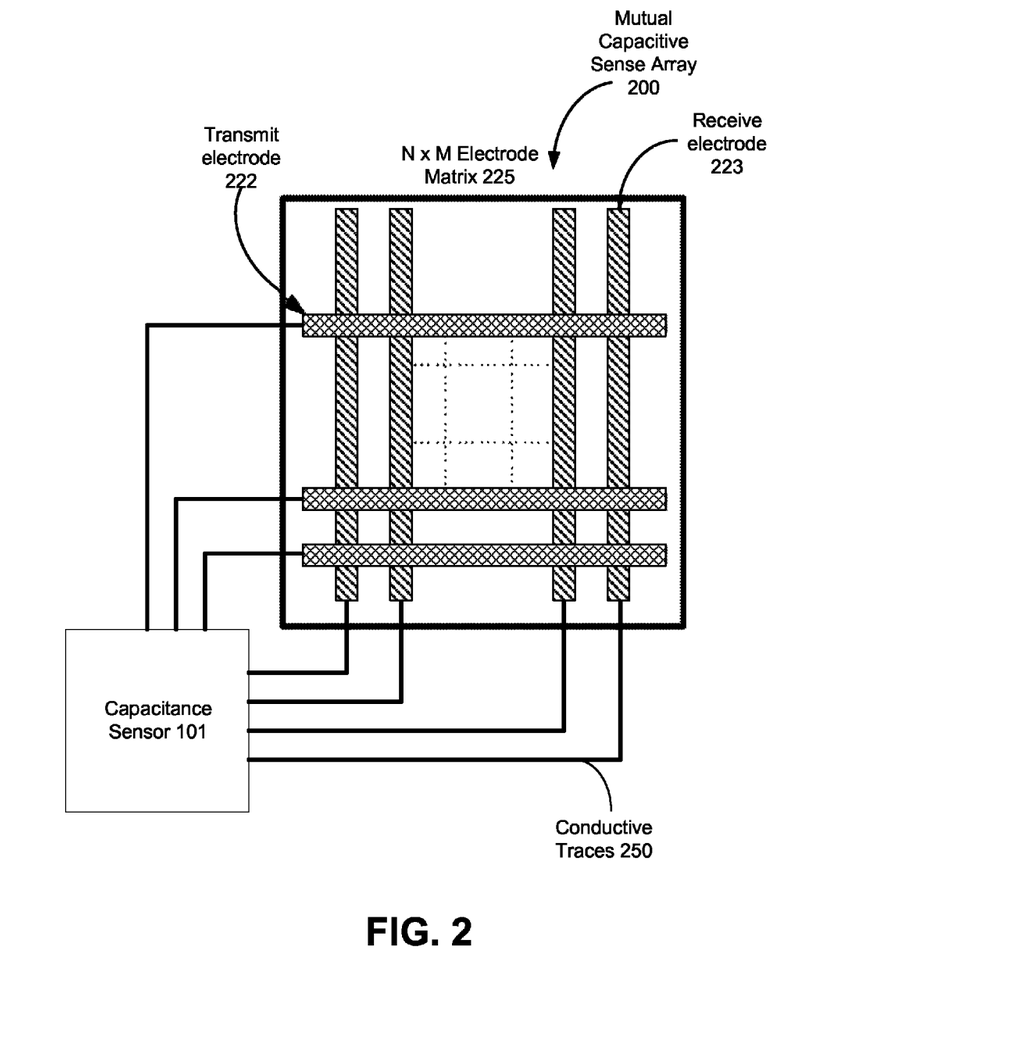
FIG. 2 is a block diagram illustrating one embodiment of a mutual capacitive touchpad sense array and a capacitance sensor that converts measured capacitances to touchpad coordinates.

FIG. 2 is a block diagram illustrating one embodiment of a mutual capacitive touchpad sense array 200 comprising an N×M electrode matrix 225 and a capacitance sensor 101 that converts measured capacitances to touchpad coordinates. The mutual capacitive sense array 200 may be, for example, the touch-sense pad 120 of FIG. 1. The N×M electrode matrix 225 includes N×M electrodes (N receive electrodes and M transmit electrodes), which further includes transmit ("TX") electrode 222 and receive ("RX") electrode 223. Each of the electrodes in N×M electrode matrix 225 is connected with capacitance sensor 101 by conductive traces 250. In one embodiment, capacitance sensor 101 may operate using a charge accumulation technique as discussed further below in FIG. 4.

Although some embodiments described herein are described using a charge accumulation technique, the capacitance sensor 101 may operate based on other techniques, such as a current versus voltage phase shift measurement, capacitive bridge divider, and charge-accumulation circuits.

The transmit and receive electrodes in the N×M electrode matrix 225 are arranged so that each of the transmit electrodes intersects each of the receive electrodes. Thus, each transmit electrode is capacitively coupled with each of the receive electrodes. For example, transmit electrode 222 is capacitively coupled with receive electrode 223 at the point where transmit electrode 222 and receive electrode 223 intersect.

Because of the capacitive coupling between the transmit and receive electrodes, a TX signal (not shown) applied to each transmit electrode induces a current at each of the receive electrodes. For instance, when a TX signal is applied to transmit electrode 222, the TX signal induces an RX signal (not shown) on the receive electrode 223 in N×M electrode matrix 225. The RX signal on each of the receive electrodes can then be measured in sequence by using a multiplexor to connect each of the N receive electrodes to a demodulation circuit in sequence. The capacitance associated with each intersection between a TX electrode and an RX electrode can be sensed by selecting every available combination of TX electrode and RX electrode.

When an object, such as a finger, approaches the N×M electrode matrix 225, the object causes a decrease in capacitance affecting only some of the electrodes. For example, if a finger is placed near the intersection of transmit electrode 222 and receive electrode 223, the presence of the finger will decrease the capacitance between the transmit electrode 222 and 223. Thus, the location of the finger on the touchpad can be determined by identifying both the receive electrode having a decreased capacitance and the transmit electrode to which the TX signal was applied at the time the decreased capacitance was measured on the receive electrode. Thus, by sequentially determining the capacitances associated with each intersection of electrodes in the N×M electrode matrix 225 the locations of one or more inputs can be determined. The conversion of the induced current waveform to touch coordinates indicating a position of an input on a touch sense pad is known to those skilled in the art.

Figure 3:
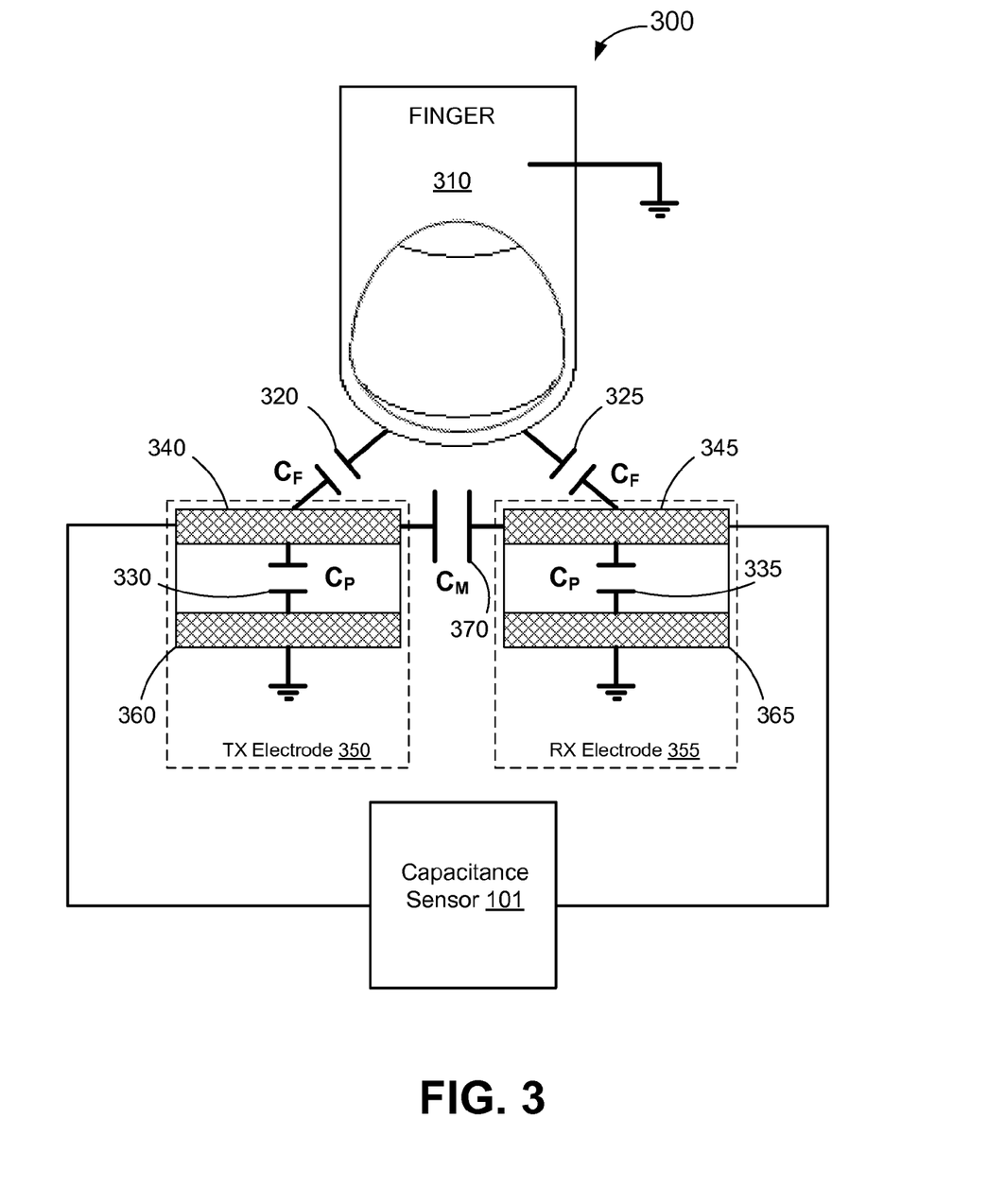
FIG. 3 illustrates the electrical characteristics of a pair of transmit-receive capacitive sense elements according to an embodiment of the present invention.

FIG. 3 illustrates the electrical characteristics of a pair TX-RX capacitive sense elements 300 ("TX-RX 300") according to an embodiment of the present invention. The TX-RX 300 includes a finger 310, a TX electrode 350, an RX electrode 355, and a capacitance sensor 101. The TX electrode 350 includes an upper conductive plate 340 ("UCP 340") and a lower conductive plate 360 ("LCP 360"). The RX electrode 355 includes an upper conductive plate 345 ("UCP 345") and a lower conductive plate 365 ("LCP 365").

The capacitance sensor 101 is electrically connected to the upper conductive plates 340 and 345 of TX electrode 350 and RX electrode 355, respectively. The upper conductive plates 340 and 345 are separated from the lower conductive plates 360 and 365, respectively, by air, dielectric, or any non-conductive material known to those skilled in the art. Similarly, the upper conductive plates 340 and 345 are separated from one another by air or dielectric material. The finger 310 and lower conductive plates 360 and 365 are electrically grounded.

Each of the transmit and receive electrodes 350 and 355, respectively, has a parasitic capacitance $C_P$ and a mutual capacitance $C_M$. The parasitic capacitance of a sense element (TX/RX electrode) is the capacitance between the sense element and ground. In the TX electrode 350, the parasitic capacitance is the capacitance between the UCP 340 and the LCP 360 as depicted by $C_P$ 330. In the RX electrode 355, the parasitic capacitance is the capacitance between the UCP 345 and the LCP 365 as depicted by $C_P$ 335. The mutual capacitance of the sense element is the capacitance between the sense element and other sense elements. Here, the mutual capacitance is the capacitance between TX electrode 350 and RX electrode 355, denoted as $C_M$ 370.

The proximity of an object, such as a finger 310, near the TX electrode 350 and RX electrode 355 may change the capacitance between the electrodes as well as the capacitance between the electrodes and ground. The capacitance between the finger 310 and the electrodes is shown in FIG. 3 as $C_F$ 320 and $C_F$ 325. $C_F$ 320 is the capacitance between the UCP 340 and the finger 310. $C_F$ 325 is the capacitance between the UCP 345 and the finger 310. The magnitude of the change in capacitance induced by the finger 310 can be detected and converted to a voltage level or a digital code that can be processed by a computer or other circuit as described above. In one exemplary embodiment, Cf may range from approximately 10-30 picofarads (pF). Alternatively, other ranges may occur.

The measured capacitance of the sense elements as seen from capacitance sensor 101 includes the parasitic and mutual capacitances $C_P$ and $C_M$ in addition to $C_F$. The baseline capacitance may be described as the capacitance of the sense element when no input (i.e., a finger touch) is present, or $C_P$ and $C_M$. The capacitance sensor 101 and supporting circuitry must be configured to resolve a difference between the baseline capacitance and the capacitance including $C_F$ in order to accurately detect a legitimate presence of a conductive object. This is further discussed in FIG. 2 and is generally known to those skilled in the art.

Figure 4:
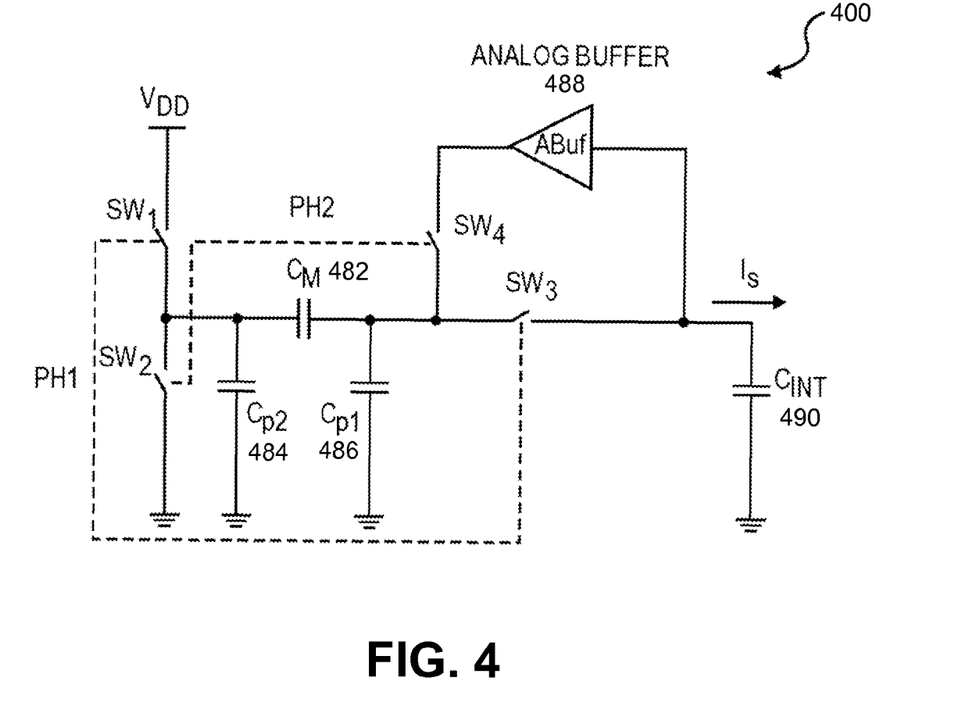
FIG. 4 illustrates a mutual capacitive sense circuit for sensing the mutual capacitance of the capacitor $C_M$ in a mutual capacitance sense mode according to an embodiment of the present invention.

FIG. 4 illustrates a mutual capacitive sense circuit 400 for sensing the mutual capacitance of the capacitor $C_M$ 482 in a mutual capacitance (transmitter-receiver or TX-RX) sensing mode according to an embodiment of the present invention. The capacitive sense circuit 400 is one embodiment of the capacitance sensor 101 in FIGS. 1-3. The capacitors $C_{P1}$ 486 and $C_{P2}$ 484 represent the parasitic capacitances of two sense elements. The mutual capacitive sense circuit 400 may operate using two non-overlapping phases: PH1 and PH2, which cycle repeatedly. During PH1, the switches SW1 and SW3 are turned on, while during PH2, the switches SW2 and SW4 are turned on. The switches SW1 and SW2 function as a transmitter driver that charges the capacitor $C_M$ 482 during PH1 when SW1 and SW3 are turned on and discharges the capacitor $C_M$ 482 during PH2 when SW2 and SW4 are turned on.

The switches SW3 and SW4 function as current demodulation receiver switches. The analog buffer 488 keeps the receiver electrode potential approximately the same during both PH1 and PH2 operation phases, shielding the circuit 480 from the $C_{P1}$ 486 parasitic capacitance change. It should be noted that the integration capacitor $C_{INT}$ 490 is considered part of the mutual capacitive sense circuit 400 and is shown here for ease of explanation. During PH1, i.e., the charge cycle, the voltage potential for the capacitor Cm 482 is $V_{CM}=V_{DD}-V_{CINT}$, the voltage potential for the parasitic capacitors $C_{P1}$ 486 and $C_{P2}$ 484 are $V_{CP1}=V_{CINT}$, $V_{CP2}=V_{DD}$. During PH2, i.e., the discharge cycle, the voltage potential for the capacitor $C_M$ 582 is $V_{CM}=V_{ABUF}=V_{CINT}=V_{CP1}$. The process of turning off and on the switches SW1-SW4 during PH1 and PH2 may be repeated sequentially for all of the sense elements in the sense array such as, for example, mutual capacitive sense array 200. The amount of power dissipated across all of the capacitive sense elements of mutual capacitive sense array 200 during the sequential switching process is the switching power of the mutual capacitive sense array.

Figure 5:
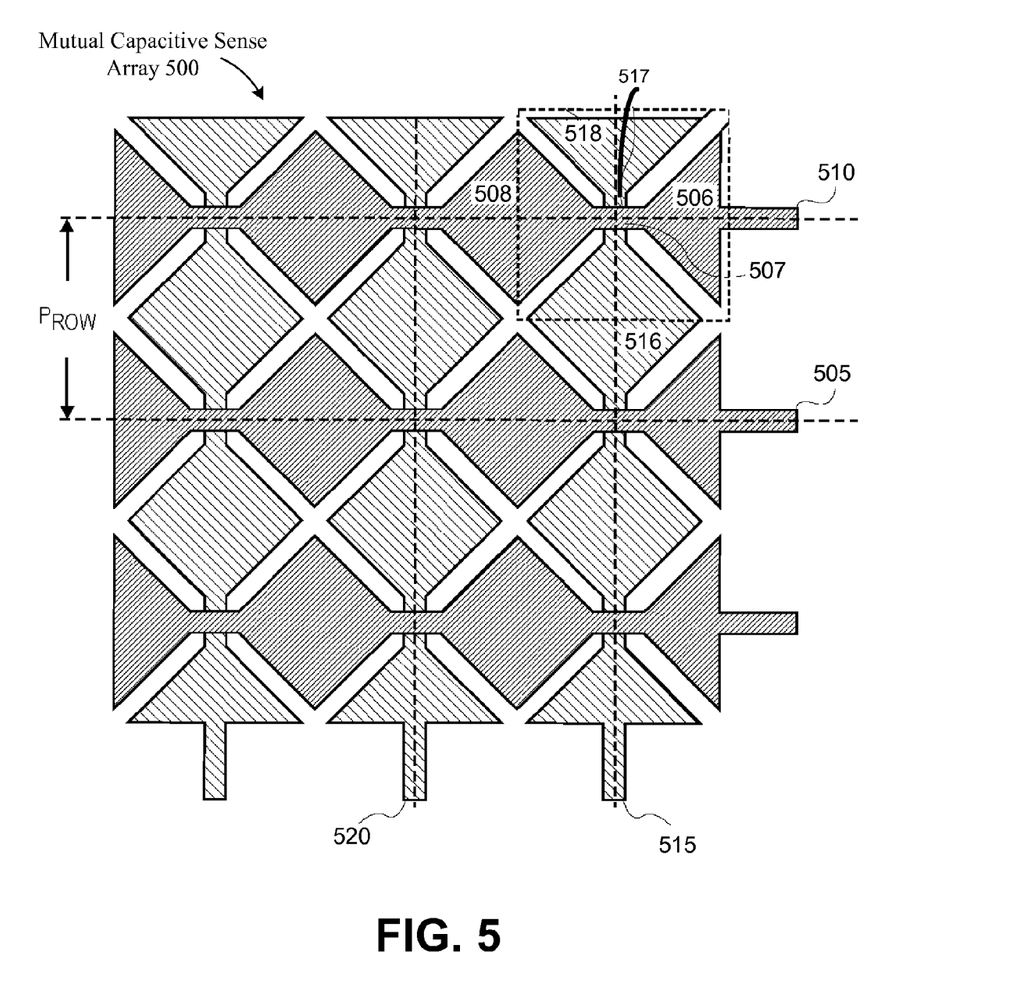
FIG. 5 illustrates a plan view of an exemplary embodiment of a capacitance sense array.

FIG. 5 is a plan view of an exemplary embodiment of a mutual capacitance sense array 500 ("sense array 500"). A first substrate contains the column sense elements 516 and 518 electrically coupled to each other by a column interconnect 517 and further coupled to a column I/O 515 to form a column oriented along the Y-axis. The Y-axis I/O's correspond to the transmit electrodes of FIG. 2. The first substrate is aligned to a second substrate containing row sense elements 506 and 508 electrically coupled to each other by a row interconnect 507 and further coupled to a row I/O 510 to form a row oriented along the X-axis. The X-axis I/O's correspond to the receive electrodes of FIG. 2. In one embodiment, sense elements 508 and 516 are substantially diamond shaped, and sense elements 506 and 518 are located on the edges of the sense array 500 and have a substantially half-diamond shaped topology. The electrical characteristics between the full and half-diamond shaped topologies are further described below.

The orientation of the axes may be switched or configured in other configurations known to those skilled in the art. As depicted, the primary sense elements are substantially diamond shaped and overlap only at the vertices along a row or column to limit the parasitic capacitance ($C_p$) caused by the overlap of the first and second layer.

In one embodiment, the sense array 500 is arranged in conjunction with a liquid-crystal display (LCD) (not shown), where the boundaries and dimensions of the LCD display are similar and align with the sense array 500. The area of the sense array 500 with an underlying LCD display is known in the art as the LCD active area. The area of the sense array 500 with no underlying LCD display is known as the bezel (not shown). Other types of displays may be used instead of an LCD display. For example, other applicable display technologies include light emitting diodes ("LED"), organic light emitting diodes ("OLED"), nanocrystal displays, carbon nanotube displays, plasma displays, or other flat panel technologies known by those skilled in the art.

Figure 6A:
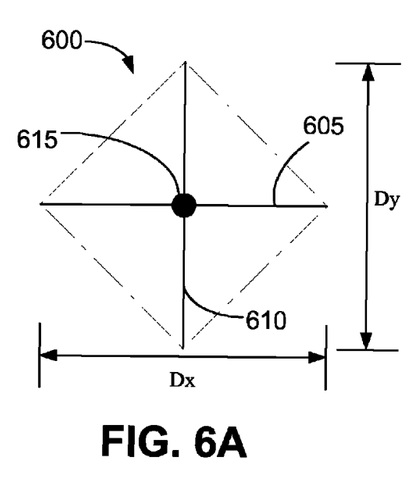
FIG. 6A illustrates an embodiment of a complete mutual capacitance sense element according to an embodiment of the present invention.

FIG. 6A is a diagram depicting one embodiment of a complete mutual capacitive sense element 600 ("sense element 600") and is thus considered to be regarded as illustrative instead of limiting on the invention. Sense element 600 includes bisector 605, bisector 610, and center-of-mass point 615. Bisectors 605 and 610 have lengths Dx and Dy, respectively. In one embodiment, sense element 600 is substantially diamond shaped. However, other shapes and sizes may be implemented such as chevrons, triangles, rhomboids, or other shapes typically used and known to those skilled in the art. In one embodiment, sense element 600 may be substantially similar to sense element 516 in FIG. 5.

The center-of-mass, also known as the centroid or geometric center, for a two dimensional shape X, is the intersection of all straight lines that divide the shape into two parts of equal moment about the line. The centroid can also be described as the arithmetic mean of all points of the shape X. For sense element 600, bisectors 605 and 610 intersect at the center of sense element 600 at the center-of-mass point 615.

Figure 6B:
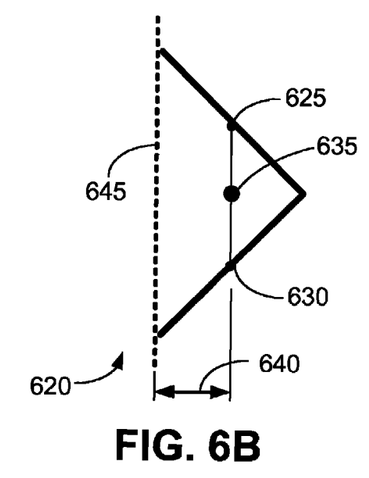
FIG. 6B illustrates an embodiment of a partial mutual capacitive sense element according to an embodiment of the present invention.
Figure 6C:
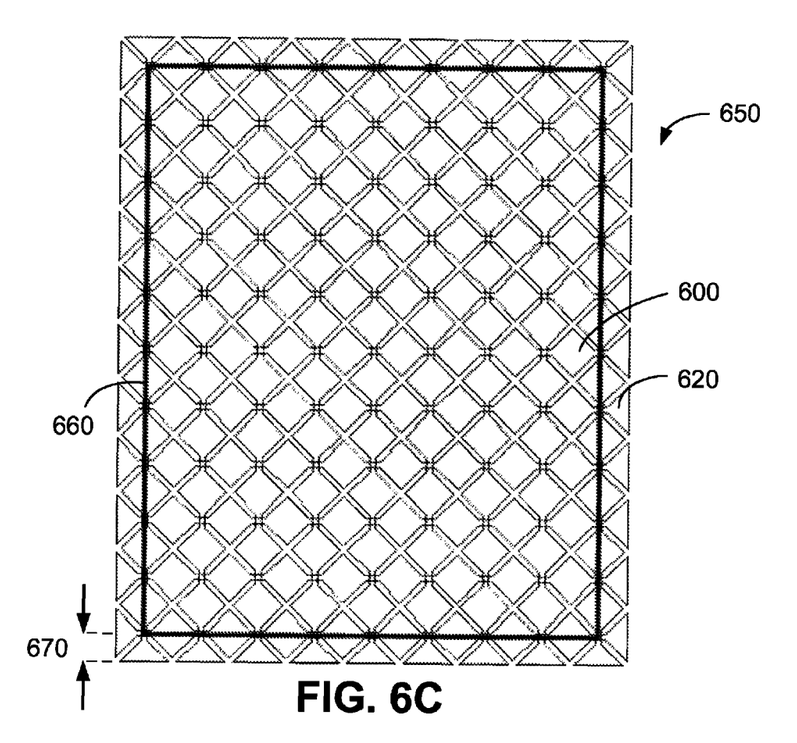
FIG. 6C is a diagram illustrating a mutual capacitive sense array configured to minimize edge error in TMA applications, according to one embodiment of the present invention.

FIG. 6B is a diagram depicting one embodiment of a partial capacitance sense element 620 ("sense element 620" or "partial sense element 620") and is thus to be regarded as illustrative instead of limiting on the invention. The sense element 620 is shown as substantially a half-diamond shape, however other shapes and sizes may be implemented and are known to those skilled in the art. Sense element 620 includes bisector 625, bisector 630, center-of-mass point 635, panel edge 645, and center-of-mass error 640. In one embodiment, the panel edge 645 is the physical edge of a mutual capacitance sense array 650, as shown in FIG. 6C. The center-of-mass error 640 is the distance between the center-of-mass point 635 and the panel edge 645. The center-of-mass of the sense element 620 can be estimated assuming that the field associated with mutual capacitance is located near the edges of the sense elements 600, 620, as described above in FIG. 2. The panel edge 645 does not contribute to the total mutual capacitance because there are no adjacent sense elements outside of panel edge 645. As such, the arithmetic mean of all points on partial sense element 620 only include bisectors 625 and 630, resulting in a center-of-mass point 635 located a distance equal to center-of-mass error 640 from what would be the center of the complete sense element 600.

In one embodiment, the calculation to determine the center-of-mass in FIG. 6B is governed by the equation 1, where Dx is the distance between opposite points of the complete sense element 600. In effect, the center-of-mass error 640 in each partial sense element 620 results in a reduced accuracy for position calculations to determine the location of an object in contact or in close proximity to the sense element 620, as discussed below.

$$\text{Center of Mass} = \frac{Dx}{4} \qquad (1)$$

FIG. 6C is a diagram illustrating a mutual capacitance sense array 650 ("sense array 650") configured to minimize edge error in touch-screen multi-touch all-points (TMA) applications, according to one embodiment of the present invention. The mutual capacitance sense array 650 includes a plurality of complete sense elements 600, a plurality of partial sense elements 620, an LCD active area 660, and bezel width 670. The LCD active area 660 is depicted as a boundary line in FIG. 6C, where the user accessible active area (LCD active area 660) is the area within and up to the boundary line. The area located outside of the LCD active area 660 is the bezel. The LCD active area 660 and bezel are further described above in conjunction with FIG. 5. According to one embodiment, the sense array 650 may be comprised of indium-tin-oxide (ITO); however, other materials may be used and are known to those skilled in the art. In another embodiment, the dimensions of sense array 650 are 65 mm×110 mm with a 5% loss in usable area (LCD active area 660). The amount of accessible user area lost is dependent upon the size of the sense array 650 and relative size of the sense elements 600 and 620.

As depicted in FIG. 6C, the active area of the sense array 650 is limited to the distance of a half-sense element (sense element 620) inside from the panel edge 645 (bezel width 670). In other words, the "touch screen" area (LCD active area 660) is typically the visible display area that a user would interact that may include graphics, pixels, text, or the like. On the other hand, the bezel area, or the area of the sense array 650 outside of the LCD active area 660 not featuring an underlying visible display, is accessible but not visible to the user. For example, the bezel area may be "blacked out" by manufacturing means or appear to the user to be a non-interactive portion outside of the touch screen area. However, the bezel area is a fully functional portion of the sense array 650 despite its non-use and reduced tracking accuracy as further described below.

Figure 6D:
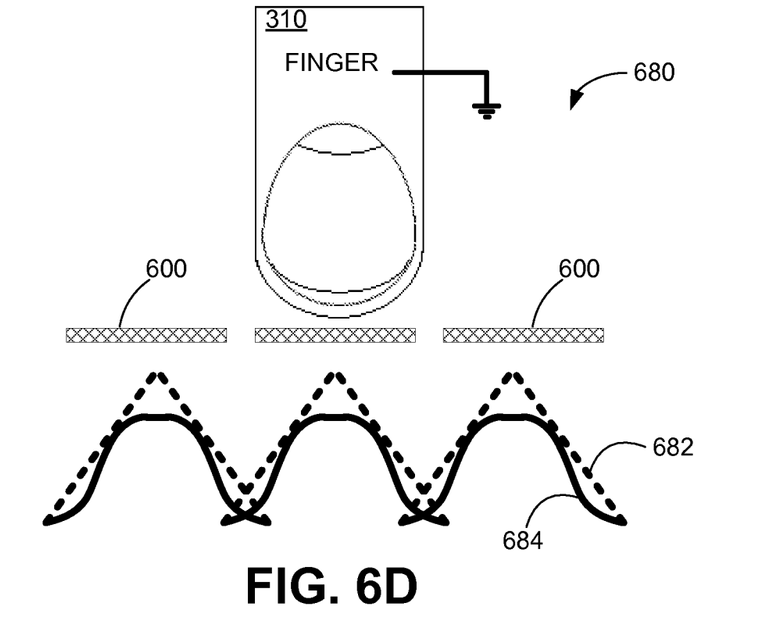
FIG. 6D is a diagram illustrating an ideal touch response versus a real touch response upon contact with a touching object on a mutual capacitive sense array, according to an embodiment of the present invention.

Table 1 illustrates several centroid algorithms that may be used to determine the location of an object (user input) that comes into contact or within proximity of the sense array 650. It should be noted that the list in Table 1 is not exhaustive and other algorithms may be used and are known to those skilled in the art.

touching object 310, sense elements 600, ideal touch response 682 and real touch response 684. In one embodiment, the touching object 310 is a finger or a stylus pen. As shown, the three adjacent sense elements 600 shown are substantially the same and represent complete sense elements as depicted in FIG. 6A. The ideal touch response 682 corresponds to the ideal waveform generated by the contact or proximal positioning of a touching object 310 with adjacent sense elements 600. The real touch response 684 corresponds to a typical real or actual waveform generated by the contact or proximal positioning of a touching object 310 with adjacent sense elements 600. As shown in diagram 680, the real touch responses 684 are substantially similar with each sense element 600 and approximate the ideal touch response well. The centroid algorithms of Table 1 are derived under the assumption that the touch responses of each sense element has the same center-of-mass. Therefore, the uniformity of the real touch responses 684 result in a more accurate centroid calculation. In one embodiment, adjacent sense elements 600, like that shown in diagram 680, are found around the center portion area of the sense array 650.

Figure 6E:
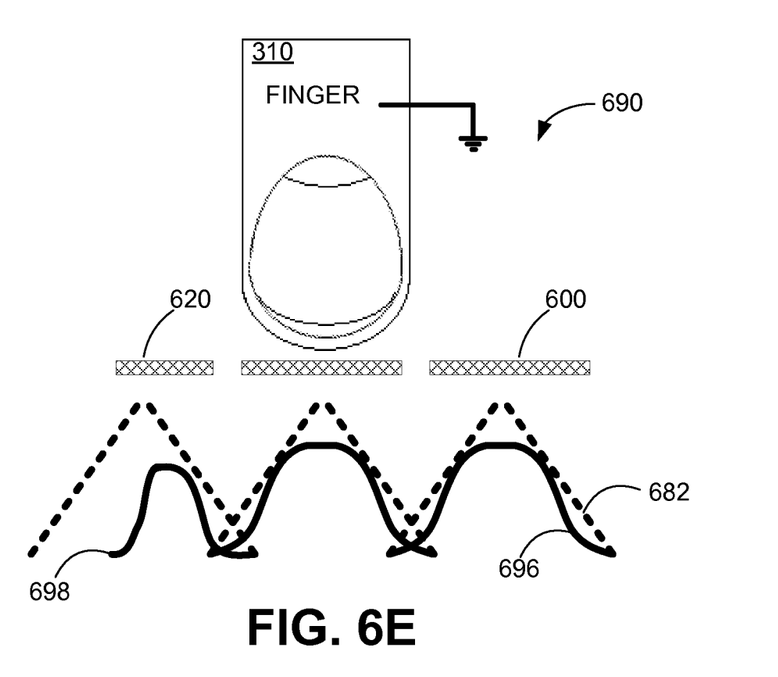
FIG. 6E is a diagram illustrating an ideal touch response versus a real touch response upon contact with a touching object on a mutual capacitive sense array, according to an embodiment of the present invention.

FIG. 6E is a diagram 690 depicting an ideal touch response versus a real touch response upon contact with a touching object on a mutual capacitive sense array, according to an embodiment of the present invention. Diagram 680 includes a touching object 310, sense elements 600, partial sense element 620, ideal touch response 692, and real touch responses 696 and 698. Real touch response 696 corresponds to sense element 600. Real touch response 698 corresponds to sense

TABLE 1

| Centroid Algorithms for Calculating the Position of a User Input | |
|---|---|
| $x_c = \frac{Res}{N-1} \cdot \left[ i + \frac{S_{i+1} - S_{i-1}}{S_{i-1} + S_i + S_{i+1}} \right], \quad i = 0 \ldots (N-1)$ | 3-censors centroid algorithm |
| $x_c = \frac{Res}{N-1} \cdot \left[ i + \frac{2 \cdot S_{i+2} + S_{i+1} - S_{i-1} - 2 \cdot S_{i-2}}{S_{i-2} + S_{i-1} + S_i + S_{i+1} + S_{i+2}} \right], \quad i = 0 \ldots (N-1)$ | 5-sensors centroid algorithm |
| $x_c = \frac{Res}{N-1} \cdot \left[ i + \frac{S_{i+1} - S_{i-1}}{2 \cdot (S_i - \min(S_{i+1}, S_{i-1}))} \right], \quad i = 0 \ldots (N-1)$ | linear interpolation algorithm |
| $x_c = \frac{Res}{N-1} \cdot \left[ i + \frac{0.5 \cdot (\ln S_{i+1} - S_{i-1})}{2 \cdot \ln S_i - \ln S_{i-1} - \ln S_{i+1}} \right], \quad i = 0 \ldots (N-1)$ | 3-sensors Gaussian algorithm |

By using a full-sense element design with the active area to the half-sense element inside from every edge of the panel, edge error in centroid calculations is effectively reduced, thus greatly improving the accuracy of input tracking at the edges of the sense array. For example, when a user input, such as a finger, touches or is placed near the edge of the sense array 650, no data (additional capacitance) is contributed from the portion of the finger that extends off of the edge of the sense array 650. The reduced mutual capacitance contribution for a partial sense element is even more pronounced at the corners of the sense array 650. In contrast, a complete sense element, such as sense element 600, will have a higher mutual capacitance contribution due to the adjacent sense elements located on each side of the sense element. Therefore, edge and corner accuracy will typically be reduced in comparison with tracking accuracy towards the center of the sense array 650 and is discussed further in conjunction with FIGS. 6D and 6E.

FIG. 6D is a diagram 680 depicting an ideal touch response versus a real touch response upon contact with a touching object on a mutual capacitive sense array, according to an embodiment of the present invention. Diagram 680 includes a element 620. In one embodiment, the sense element 620 is an edge sense element on the left of the sense array 650. The real touch responses 696 for both sense elements 600 approximate the ideal touch response 692 well, as shown above in FIG. 6D. In contrast, the partial sense element 620 produces a substantially distorted, lower amplitude real touch response 698 as compared to real touch responses of sense elements 600. It would be obvious to one skilled in the art that the center of mass calculation using edge sense element data, such as that produced by sense element 620, for example, will be skewed to the center of the panel.

Figure 7A:
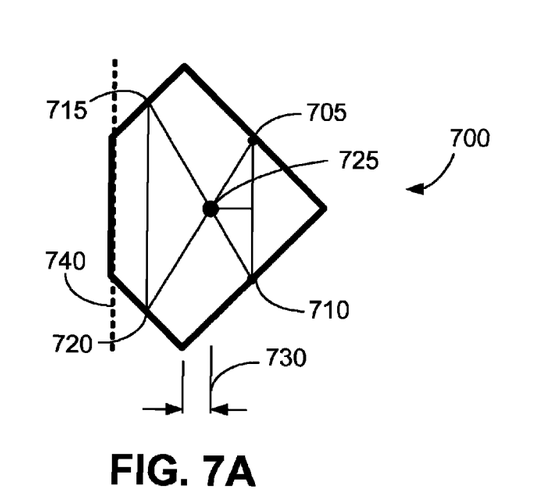
FIG. 7A illustrates an embodiment of a partial mutual capacitive sense element according to an embodiment of the present invention.
Figure 7B:
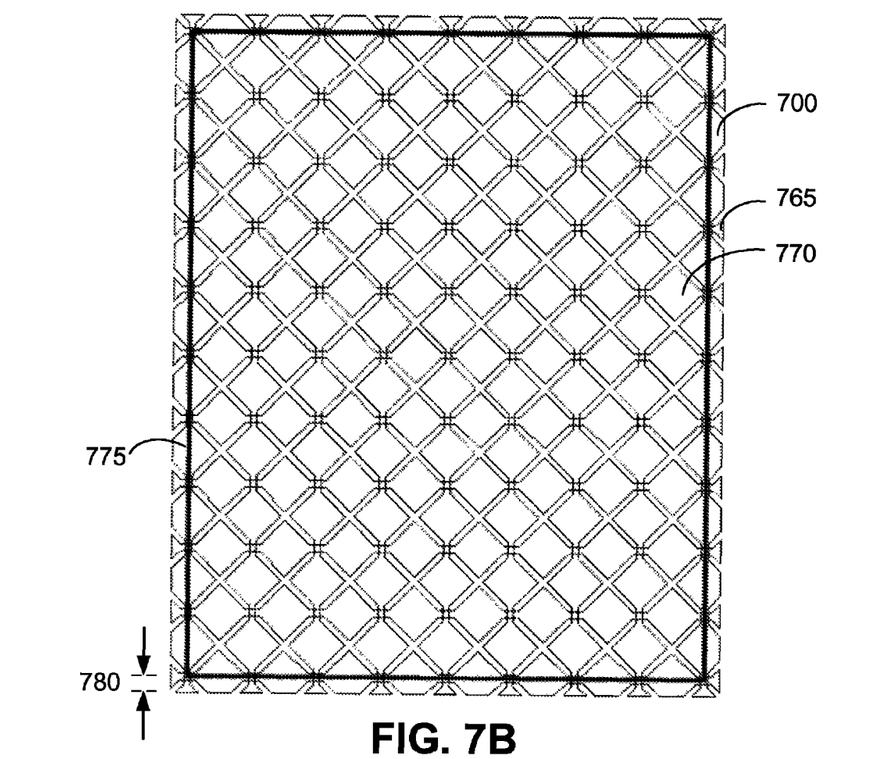
FIG. 7B is a diagram illustrating a mutual capacitive sense array configured to minimize edge error in TMA applications, according to one embodiment of the present invention.

FIG. 7A is a diagram depicting one embodiment of a partial capacitive sense element 700 ("sense element 700," "partial sense element 700") and is thus to be regarded as illustrative instead of limiting on the invention. The sense element 700 is shown as substantially a ¾ diamond shape, however other shapes and sizes may be implemented and are known to those skilled in the art. Sense element 700 includes bisectors 705, 710, 715, 720, center-of-mass point 725, panel edge 740, and center-of-mass error 730. In one embodiment, the panel edge 740 is the edge of a mutual capacitive sense array 750, as shown in FIG. 7B. The center-of-mass error 730 is the distance between the center-of-mass point 725 and the center-of-mass point of what would be a complete sense element, such as that described in FIG. 6A above. The center-of-mass of the partial sense element 700 can be estimated assuming that the field associated with mutual capacitance is located near the edges of the sense element, as described above in FIG. 2. The panel edge 740 does not contribute to the total mutual capacitance because there are no adjacent sense elements on the panel edge 740.

As such, the arithmetic mean of all points on partial sense element 700 results in a center-of-mass point 725 located a distance equal to center-of-mass error 730 from what would be the center of the complete sense element 600. In effect, the center-of-mass error 730 in each partial capacitive sense element 700 results in a reduced accuracy for position calculations to determine the location of an object in contact or in close proximity to the mutual capacitive sense array 750. However, sense element 700 provides an improved center-of-mass point 725 than that of a half-diamond shaped sense element 620, thus providing greater accuracy in object tracking. The effect of the center-of-mass error on centroid calculations is discussed above in conjunction with Table 1 and FIGS. 6A-E.

FIG. 7B is a diagram illustrating a mutual capacitive sense array 750 ("sense array 750") configured to minimize edge error in TMA applications, according to one embodiment of the present invention. The sense array 750 includes three different types of capacitive sense elements ("sense elements") 700, 765, and 770. Sense array 750 further includes an LCD active area 775 and bezel width 780. According to one embodiment, the sense array 750 may be comprised of indium-tin-oxide (ITO); however other materials may be used and are known to those skilled in the art. In an embodiment, the LCD active area 775 is the user boundary 775.

In one embodiment, sense element 770 is substantially diamond shaped and may be similar in size and shape to the complete sense element 600. However, other shapes and sizes may be implemented such as chevrons, triangles, rhomboids, or other shapes typically used and known to those skilled in the art. Sense element 700 is a fractional diamond design as described in FIG. 7A above. In one embodiment, the sense element 700 is approximately 75% of the total area of a complete sense element 770. Sense element 765 is also a fractional diamond design comprising approximately 25% of the total area of a complete sense element 770. Sense element 765 exhibits a center-of-mass error greater than that of sense element 700 due to its increased fractional design.

As shown in FIG. 7B, the LCD active area 775 is limited to a partial-diamond shaped sense element 765 inside from every edge of the sense array 750 at a distance equal to the bezel width 780, according to an embodiment of the present invention. The LCD active area 775 defines the active user area. By using full-sense element design with active area to the half-sense element inside from every edge of the panel, edge error in centroid calculations is effectively reduced, thus greatly improving the accuracy of finger/stylus tracking at the edges of the sense array 750. The amount of accessible user area lost is dependent upon the size of the sense array 750 and relative size of the sense elements 700, 765, 770. In one embodiment, the dimensions of sense array 750 are 40 mm×64 mm with a 5% loss in usable area (LCD active area 775). In an embodiment, the sense elements 700 are disposed substantially along the border (i.e., the edges) of the user boundary (i.e., the visual display area, or LCD active area 775).

There is a trade-off between the available user accessible active area and a performance improvement in object tracking accuracy. In general, sense array 750 provides greater user accessible active area than sense array 650. However, the introduction of the fractional sense element 760 within the user boundary 775 will reduce tracking accuracy because of the center-of-mass errors discussed above.

Figure 8A:
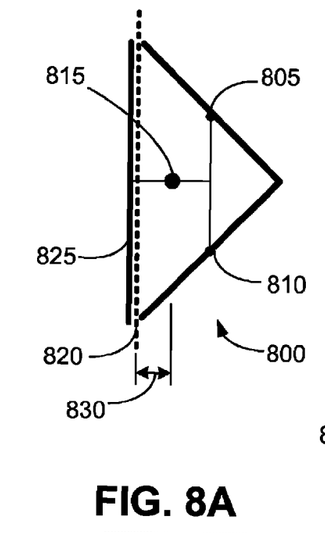
FIG. 8A illustrates an embodiment of a partial mutual capacitive sense element according to an embodiment of the present invention.
Figure 8B:
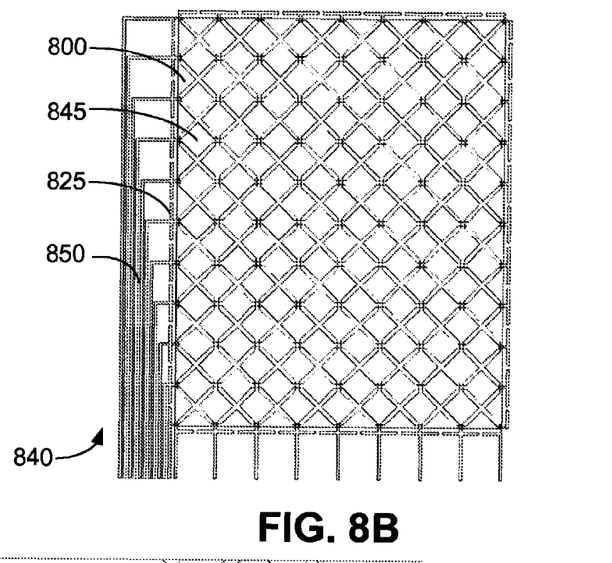
FIG. 8B is a diagram illustrating a mutual capacitive sense array configured to minimize edge error in TMA applications, according to one embodiment of the present invention.

FIG. 8A is a diagram depicting one embodiment of a partial capacitive sense element 800 ("sense element 800," and "partial sense element 800") and is thus to be regarded as illustrative instead of limiting on the invention. The sense element 800 is shown as substantially a half-diamond shape, however other shapes and sizes may be implemented and are known to those skilled in the art. Sense element 800 includes bisector 805, bisector 810, center-of-mass point 815, panel edge 820, center-of-mass error 830, and virtual sense element 825. In one embodiment, the panel edge 820 is the edge of a mutual capacitive sense array 840, as shown in FIG. 8B. The center-of-mass error 830 is the distance between the center-of-mass point 815 and the panel edge 820.

The center-of-mass of partial sense element 800 can be estimated assuming that the field associated with mutual capacitance is located near the edges of the sense element for touch-screen multi-touch all-points (TMA) applications. Accordingly, the panel edge 820 does not contribute to the total mutual capacitance because there are no adjacent sense elements on the panel edge 820. However, the virtual sense element 825 creates an additional mutual capacitance at the panel edge 820, thereby pulling the center-of-mass point 815 closer to the true center-of-mass of the sense element 800, as discussed below.

As such, the arithmetic mean of all points on partial sense element 800 include bisectors 805, 810, and virtual sense element 825, resulting in a center-of-mass point 815 located a distance equal to center-of-mass error 830 from what would be the center of a complete capacitance sense element 600, as described above.

In one embodiment, the calculation to determine the center-of-mass of sense element 800 is governed by the equation 2, where Dx is the distance between opposite points the complete sense element 600. In effect, the center-of-mass error 830 in each sense element 800 results in a reduced accuracy for position calculations to determine the location of an object (or user input) in contact or in close proximity to the sense element 800.

$$\text{Center of Mass} = \frac{Dx}{4} \cdot \frac{\sqrt{2}}{1+\sqrt{2}} \approx 0.146 \, Dx \quad (2)$$

FIG. 8B is a diagram illustrating a mutual capacitive sense array 840 ("sense array 840") configured to minimize edge error in TMA applications, according to one embodiment of the present invention. The sense array 840 includes sense elements 800 and 845, virtual sense elements 825, and connection lines 850. In one embodiment, sense element 845 may be similar in size and shape to sense element 600. Virtual sense elements 825 are shown just beyond the panel edge 820 of each row and column of sense elements and are in electrical connection with the connection lines 850.

Figure 8C:
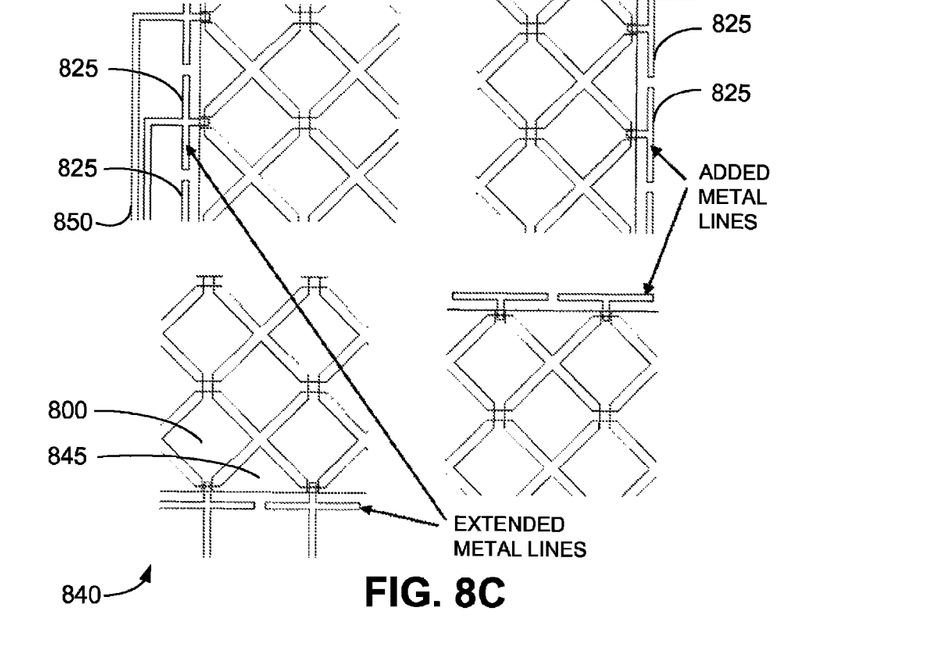
FIG. 8C is a diagram illustrating a close up view of mutual capacitive sense array configured to minimize edge error in TMA applications, according to one embodiment of the present invention.

FIG. 8C is a diagram illustrating a close up view of mutual capacitance sense array 840 configured to minimize edge error in TMA applications, according to one embodiment of the present invention. FIG. 8C includes complete sense elements 845, partial sense elements 800, virtual sense elements 825, and connection lines 850. In an embodiment, the connection lines 850 are composed of a conductive metal.

The virtual sense elements 825 simulate the effect of an additional row or column of sense elements beyond the panel edge 820, thus providing an improved center-of-mass point 815 located closer to panel edge 820 than conventional embodiments. In one embodiment, virtual sense elements 825 may be composed of metal traces that extend from the connection lines 850. As shown in FIG. 8C, the virtual sense elements 825 flare out just before the connection point of where connection lines 850 contact the sense array 840. Referring back to Table 1, the inaccuracies in the centroid calculations at the edges of sense array 840 may be significantly reduced with the improved center-of-mass error 830. In an embodiment, the virtual sense elements 825 are substantially linear sense elements.

There are significant advantages to using virtual sense elements 825 at the panel edge of sense array 840. In one embodiment, adding the virtual sense elements 825 to connection lines 850 provides no appreciable manufacturing cost increase since they may be made of the same material and do not alter the bonding process between the connection lines 850 and the sense array 840. In one embodiment, virtual sense elements 825 and connection lines 850 may be made of different conductive materials. Virtual sense element 825 may be very thin and tightly integrated with the sense array 840, wasting very little area. Furthermore, because the virtual sense elements 825 may be constructed with highly conductive materials, there is no appreciable increase in sheet resistance. In another embodiment, an LCD display (not shown) is configured underneath the sense array 840, similar to that which is described above in FIG. 6C. The edge of the LCD display typically extends to the edge of the sense array 840, where the virtual sense elements 825 will be accessible by users, but will not be visible.

Figure 9A:
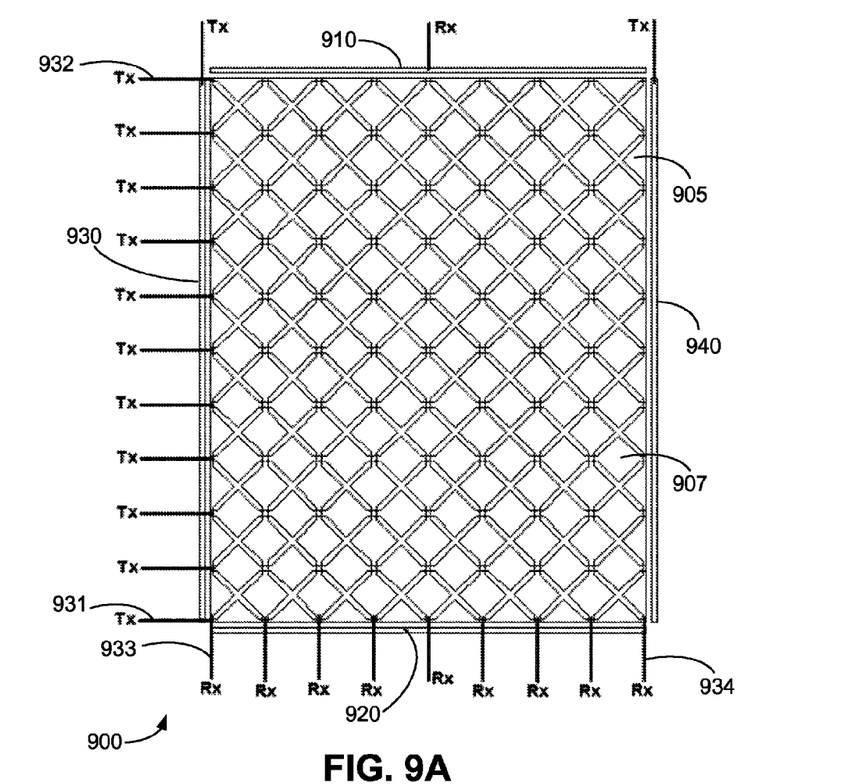
FIG. 9A is a diagram illustrating a close up view of mutual capacitive sense array configured to minimize edge error in TMA applications, according to one embodiment of the present invention.

FIG. 9A is a diagram illustrating a close up view of mutual capacitive sense array 900 ("sense array 900") configured to minimize edge error in TMA applications, according to one embodiment of the present invention. FIG. 9A includes complete mutual capacitive sense elements 907 ("sense element 907"), partial mutual capacitive sense elements 905 ("sense element 905"), additional Receive ("Rx") sense elements 910 and 920, and additional Transmit ("Tx") sense elements 930 and 940. The additional sense elements are configured to reside orthogonal and in close proximity to the panel edges of sense array 900, as shown in FIG. 9A. The sense array 900 further comprises Tx0 line ("Tx0") 931, TxN line ("TxN") 932, Rx0 line ("Rx0") 933 and RxN line ("RxN") 934. Rx sense element 910 resides along the panel edge of TxN 932 and Rx0 933-RxN 934. Rx sense element 920 resides along the panel edge of Tx0 931 and Rx0 933-RxN 934. Tx sense element 930 resides along the panel edge of Rx0 933 and Tx0 931-TxN 932. Tx sense element 940 resides along the panel edge of RxN 934 and Tx0 931-TxN 932. The additional Tx/Rx sense elements provide a similar function as the virtual sense elements 825 in FIGS. 8A-C by simulating and additional row and column of sense elements along the edges of the sense array 900. The additional sense elements of FIG. 9A are composed of similar materials as the individual sense elements 905 and 907, instead of the metal connection lines 850, as shown in FIG. 8A-C. In one embodiment, the Tx/Rx sense elements 910, 920, 930, 940 may be composed of ITO, although other materials may be used and are known by those skilled in the art. In another embodiment, the additional sense elements may be segmented to include multiple additional sense elements per side of the sense array 900.

Figure 9B:
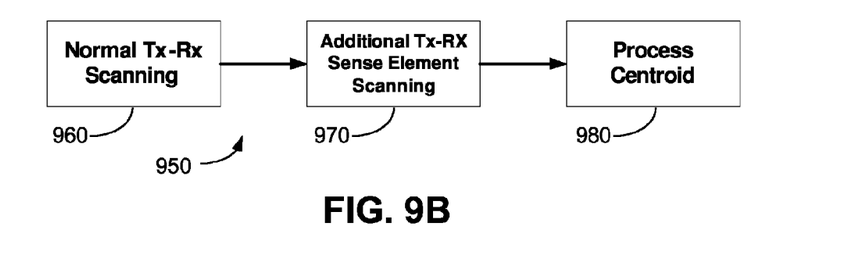
FIG. 9B is a flow chart of a method for scanning mutual capacitive sense array to minimize edge error in TMA applications according to an embodiment of the present invention.

FIG. 9B is a flow chart of a method 950 for scanning sense array 900 to minimize edge error in TMA applications according to an embodiment of the present invention. At block 960, the sense array 900 undergoes conventional Tx-Rx scanning similar to that which is described in FIG. 2. In one embodiment, the Tx-Rx scan is limited to sense elements 905 and 907 on the sense array 900 proper.

At block 970, the additional Tx/Rx sense elements 910, 920, 930, 940 are scanned. In one embodiment, each Tx/Rx sense element spans the entire length of the side of the sense array 900 and therefore will detect a user input at any point along the length of the respective Tx/Rx sense element. For example, user input detection on Tx sense element 930 will indicate that the user contacted Tx sense element 930 at any point from Tx0 931 to TxN 932.

At block 980, the centroid, or precise location of the user input, is determined by combining the normal Tx/Rx mutual capacitance scanning process of block 960, with the additional Tx/Rx sense element scanning process of block 970. The centroid algorithms may be similar to those described in Table 1. In other words, the additional Tx/Rx sense elements 910, 920, 930, 940 provide additional input data to help improve user input tracking accuracy along the edges of the sense array 900.

The particular features, structures or characteristics described herein may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A mutual capacitive sense array, the array comprising:
a first plurality of sense elements;
a second plurality of sense elements; and
a visual display disposed below the mutual capacitive sense array, wherein the visual display is aligned over the first plurality of sense elements, wherein the first plurality of elements are aligned wholly within a visual display area of the visual display, wherein the second plurality of elements are aligned wholly outside of the visual display area, wherein each of the first plurality of sense elements has a first area, and wherein each of the second plurality of sense elements has a second area, wherein the second area is less than first area.

2. The mutual capacitive sense array of claim 1, wherein the first plurality of sense elements are substantially diamond shaped.

3. The mutual capacitive sense array of claim 1, wherein the second plurality of sense elements are substantially half-diamond shaped.

4. The mutual capacitive sense array of claim 1, wherein the second plurality of sense elements are located substantially along the edges of the mutual capacitive sense array.

5. The mutual capacitive sense array of claim 1, wherein the second area is substantially 50% of the total area of the first area.

6. The mutual capacitive sense array of claim 1, wherein the visual display is a liquid crystal display (LCD).

7. The mutual capacitive sense array of claim 1, wherein the visual display is selected from the group consisting of a light emitting diode (LED) display, organic light emitting diode (OLED) display, plasma display, and flat panel display.

8. The mutual capacitive sense array of claim 1, wherein the plurality of capacitive sense elements comprises a third plurality of sense elements, wherein each of the third plurality of sense elements has a third area, wherein the second area is greater than 50% of the first area, and wherein the third area is less than 50% of the first area, and wherein the third plurality of sense elements are aligned along the edges of the visual display area.

9. The mutual capacitive sense array of claim 8, wherein the second area is substantially 75% of the first area, and wherein the third area is substantially 25% of the first area.

10. A mutual capacitive sense array, the array comprising:
   a first plurality of sense elements;
   a second plurality of sense elements; and
   a third plurality of sense elements, wherein the second plurality of sense elements are disposed substantially along the interior edges of the mutual capacitive sense array, and wherein the third plurality of sense elements are disposed substantially along the exterior edges of the mutual capacitive sense array.

11. The mutual capacitive sense array of claim 10, further comprising connection lines, wherein the connections lines are configured to connect the mutual capacitive sense array to a capacitance sensor, and wherein the plurality of sense elements are substantially linear sense elements and are formed from the connections lines.

12. The mutual capacitive sense array of claim 10, wherein the third plurality of sense elements are comprised of a same type of material as the first and second plurality of sense elements.

13. A method to improve position tracking in a touch sense device, the method comprising:
   scanning a mutual capacitive sense array for a user input, the mutual capacitive sense array comprising:
      a first plurality of sense elements;
      a second plurality of sense elements; and
      a third plurality of sense elements arranged in parallel along the exterior of the mutual capacitive sense array; and
   calculating the position of the user input based on the mutual capacitance of the first, second and third plurality of sense elements, wherein each of the second plurality of sense elements introduces a reduced accuracy in the calculation, and wherein the third plurality of sense elements improves the accuracy in the calculation.

14. The method of claim 13, wherein the reduced accuracy is caused by a non-centered center-of-mass for each of the second plurality of sense elements.

15. The method of claim 13, further comprising connection lines, wherein the connections lines are configured to connect the mutual capacitive sense array to a capacitance sensor, and wherein the third plurality of sense elements are formed from the connections lines.

16. The method of claim 13, wherein the third plurality of sense elements are comprised of a same type of material as the first and second plurality of sense elements.

17. The method of claim 13, wherein the first plurality of sense elements are substantially diamond shaped.

18. The method of claim 13, wherein the second plurality of sense elements are substantially half-diamond shaped.

19. The method of claim 13, wherein the second plurality of sense elements are located substantially along the edges of the mutual capacitive sense array.

20. The method of claim 13, wherein the third plurality of sense elements are comprised of a same type of material as the first and second plurality of sense elements.

* * * * *